US009077884B2

(12) United States Patent
House et al.

(10) Patent No.: US 9,077,884 B2
(45) Date of Patent: Jul. 7, 2015

(54) ELECTRONIC DEVICES WITH MOTION RESPONSE AND RELATED METHODS

(75) Inventors: Christopher David House, Raleigh, NC (US); Rodney Owen Williams, Cary, NC (US)

(73) Assignee: HTC CORPORATION, Taoyuan, Taoyuan County (TW)

( * ) Notice: Subject to any disclaimer, the term of this patent is extended or adjusted under 35 U.S.C. 154(b) by 405 days.

(21) Appl. No.: 13/426,030

(22) Filed: Mar. 21, 2012

(65) Prior Publication Data

US 2013/0250133 A1 Sep. 26, 2013

(51) Int. Cl.
*H04N 5/232* (2006.01)
*H04M 1/725* (2006.01)

(52) U.S. Cl.
CPC ........... *H04N 5/232* (2013.01); *H04M 1/72522* (2013.01); *H04M 2250/12* (2013.01); *H04M 2250/52* (2013.01); *H04N 5/23258* (2013.01); *H04N 5/23296* (2013.01)

(58) Field of Classification Search
USPC ........................................................ 348/208.2
See application file for complete search history.

(56) References Cited

U.S. PATENT DOCUMENTS

| 7,728,316 | B2 | 6/2010 | Fadell et al. |
| 8,514,313 | B2 | 8/2013 | Shintani et al. |
| 2007/0236451 | A1* | 10/2007 | Ofek et al. .................... 345/157 |
| 2010/0189426 | A1* | 7/2010 | Bao et al. ......................... 396/77 |
| 2011/0071757 | A1* | 3/2011 | Lee et al. ....................... 701/208 |
| 2011/0117960 | A1 | 5/2011 | Miura |
| 2012/0038675 | A1* | 2/2012 | Johnson et al. ............... 345/660 |

FOREIGN PATENT DOCUMENTS

| CN | 101558372 A | 10/2009 |
| CN | 101788876 A | 7/2010 |
| CN | 101841655 A | 9/2010 |

OTHER PUBLICATIONS

China Office Action dated Aug. 5, 2014.
Taiwan Office Action dated Dec. 1, 2014.

* cited by examiner

*Primary Examiner* — Roberto Velez
*Assistant Examiner* — Yih-Sien Kao
(74) *Attorney, Agent, or Firm* — McClure, Qualey & Rodack, LLP (57) ABSTRACT

Electronic devices with motion response and related methods are provided. In this regard, a representative electronic device includes: an image capturing device operative to acquire image data; an accelerometer operative to sense an acceleration of the electronic device; and a motion response system operative to receive acceleration information corresponding to a sensed acceleration and to alter a mode of operation of the image capturing device based, at least in part, on the acceleration information.

18 Claims, 6 Drawing Sheets

ELECTRONIC DEVICES WITH MOTION RESPONSE AND RELATED METHODS

TECHNICAL FIELD

The present disclosure generally relates to image capture.

BACKGROUND

Image capturing devices are commonplace, with many of these devices being implemented on mobile phones. Unfortunately, use of an image capturing device resident on a mobile phone may be a bit awkward. Notably, much of the functionality may only be accessed on the mobile phone after a user navigates through a number of menus and/or control settings. Once accessed, acquiring an image may additionally involve actuating any number of controls that may be provided as graphical actuators and/or physical buttons on the mobile phone.

SUMMARY

Electronic devices with motion response and related methods are provided. Briefly described, one embodiment, among others, is an electronic device comprising: an image capturing device operative to acquire image data; an accelerometer operative to sense an acceleration of the electronic device; and a motion response system operative to receive acceleration information corresponding to a sensed acceleration and to alter a mode of operation of the image capturing device based, at least in part, on the acceleration information.

Another embodiment is a method for acquiring images comprising: sensing acceleration associated with an image capturing device; and altering a mode of operation of the image capturing device based, at least in part, on the acceleration.

Other systems, methods, features, and advantages of the present disclosure will be or may become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

Having summarized various aspects of the present disclosure, reference will now be made in detail to that which is illustrated in the drawings. While the disclosure will be described in connection with these drawings, there is no intent to limit the scope of legal protection to the embodiment or embodiments disclosed herein. Rather, the intent is to cover all alternatives, modifications and equivalents included within the spirit and scope of the disclosure as defined by the appended claims.

In this regard, electronic devices with motion response and related methods are provided, some embodiments of which involve smartphones with onboard image capturing devices. In some embodiments, acceleration of the smartphone is sensed and information corresponding to the sensed acceleration is used as an input for altering a mode of operation of the image capturing device. By way of example, the altered mode may relate to a zoom function of the device such that acceleration of the smartphone towards an object results in the device zooming in toward the object. Additionally, or alternatively, the altered mode may relate to an image capturing function such that acceleration results in the device switching from a camera mode to a video capture mode of operation.

Figure 1:
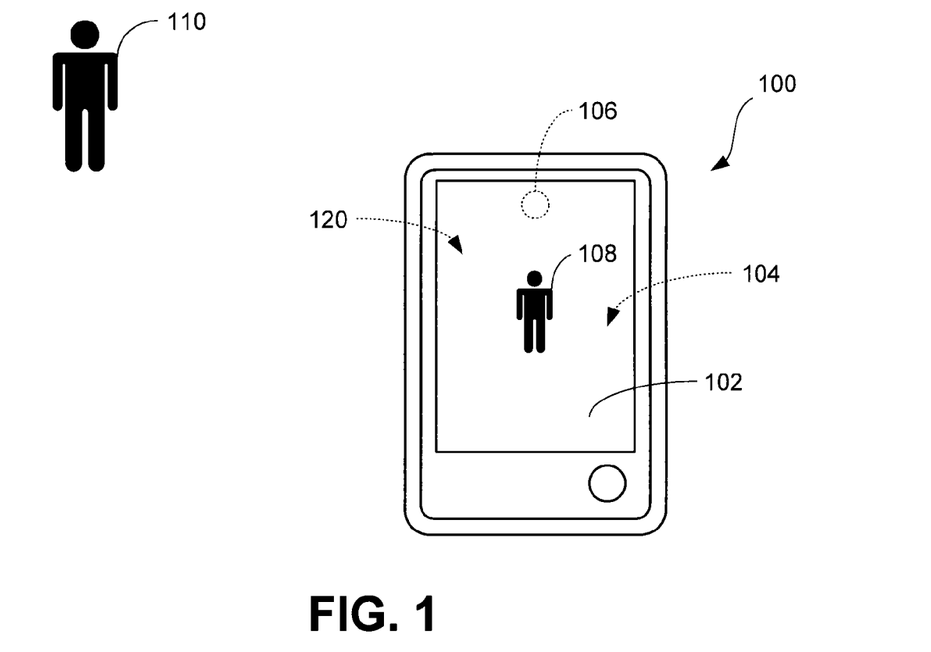
FIG. 1 is a schematic diagram of an example embodiment of an electronic device using an image capture function.

FIG. 1 is a schematic diagram of an example embodiment of an electronic device using an image capture function. As shown in FIG. 1, electronic device 100 is configured as a smartphone, although other embodiments may be configured differently, (e.g., as a digital camera or tablet computer). Device 100 incorporates a display device 102 and an image capturing device 104, which includes a rear-facing camera 106 (located on a back side of device 100). Notably, other components of the image capturing device are generally internal to device 100 and, therefore, are not shown.

FIG. 1 also depicts an image that may be acquired by the image capturing device and that is currently being displayed by the display device. The displayed image 108 is associated with an object 110. Based on the characteristics and settings of the image capturing device, as well as the size of the object and distance between the object and camera 106, the displayed image 110 exhibits a display size. In this case, the display size includes an image height that is approximately 25% of the height of the display 102.

Figure 2:
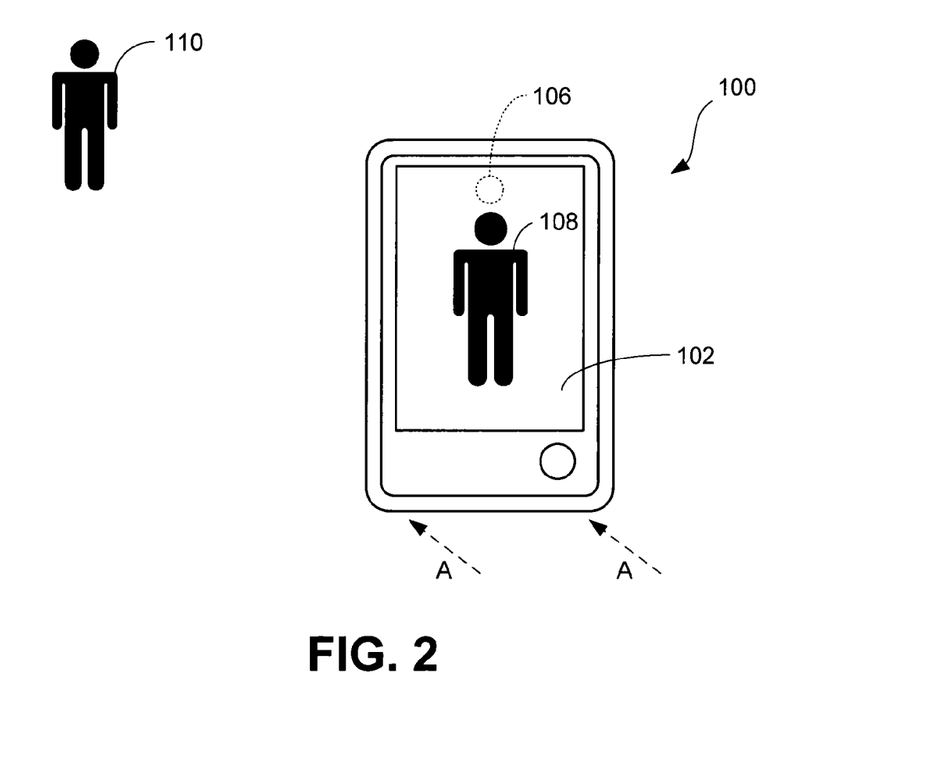
FIG. 2 is a schematic diagram of the embodiment of FIG. 1 showing motion response functionality.

FIG. 2 is a schematic diagram of the embodiment of FIG. 1 showing motion response functionality. In particular, FIG. 2 shows that the display size of displayed image 110 has increased dramatically responsive to motion of camera 106 toward object 110 (depicted by the dashed arrows "A"). Notably, the image height is now approximately 60% of the height of the display 102, while the camera has moved a negligible distance toward the object. This functionality is accomplished by a motion response system 120 that is resident on electronic device 100 and which interprets movements of device 100 to initiate various modes of operation. In this case, sensed acceleration of device 100 toward object 110 resulted in actuation of a zoom-in function of the image capturing device without further actuation by the user. It should be noted that correspondence between the magnitude of zoom and of the acceleration may vary among embodiments and/or may be adjustable.

Figure 3:
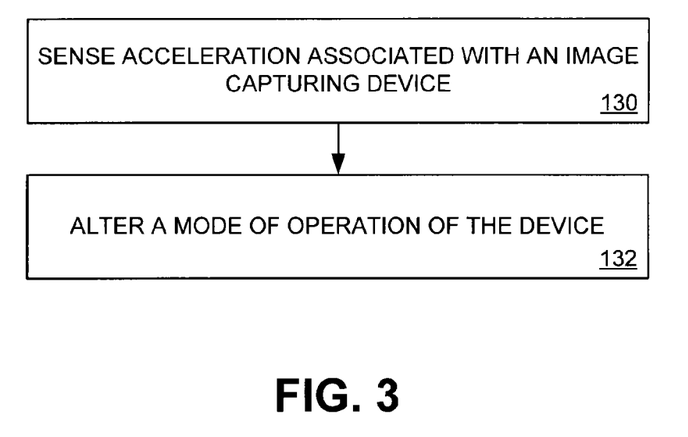
FIG. 3 is a flowchart depicting an example embodiment of a method for acquiring images.

FIG. 3 is a flowchart depicting an example embodiment of a method for acquiring images, such as may be performed by electronic device 100 of FIG. 1. As shown in FIG. 3, the method involves sensing acceleration associated with an image capturing device (block 130). In block 132, a mode of operation of the image capturing device is altered. In particular, the mode is altered, at least in part, responsive to the sensed acceleration.

Figure 4:
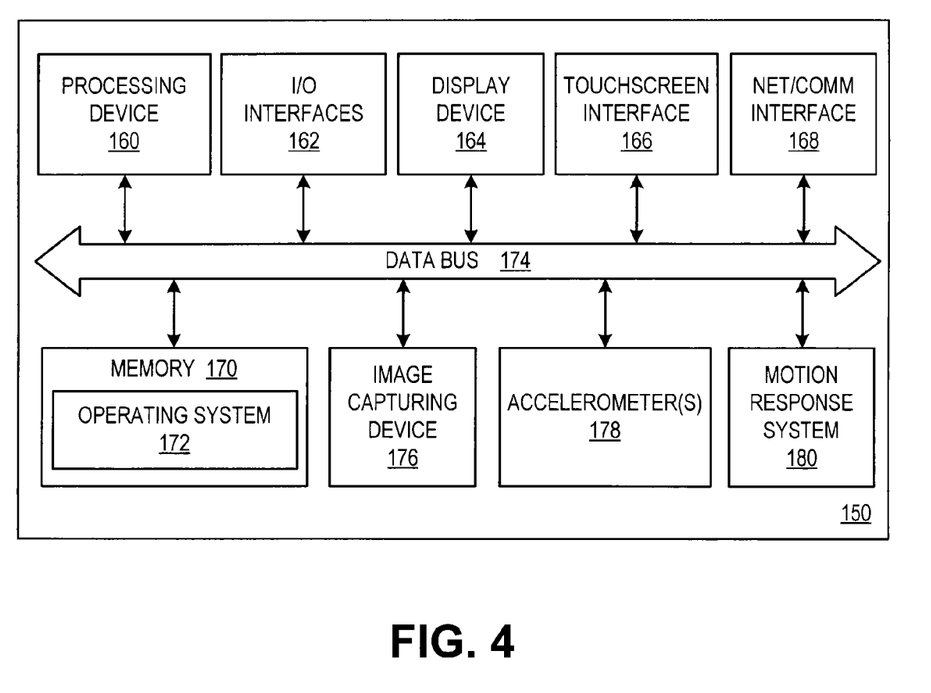
FIG. 4 is a schematic diagram of another example embodiment of an electronic device.

FIG. 4 is a schematic diagram of another example embodiment of an electronic device. As shown in FIG. 4, electronic device 150 includes a processing device (processor) 160, input/output interfaces 162, a display device 164, a touchscreen interface 166, a network/communication interface 168, a memory 170, an operating system 172, with each communicating across a local data bus 174. Additionally, the device incorporates an image capturing device 176, accelerometer(s) 178 and a motion response system 180.

The processing device 160 may include a custom made or commercially available processor, a central processing unit (CPU) or an auxiliary processor among several processors, a semiconductor based microprocessor (in the form of a microchip), a macroprocessor, one or more application specific integrated circuits (ASICs), a plurality of suitably configured digital logic gates, and other electrical configurations comprising discrete elements both individually and in various combinations to coordinate the overall operation of the system.

The memory 170 may include any one of a combination of volatile memory elements (e.g., random-access memory (RAM, such as DRAM, and SRAM, etc.)) and nonvolatile memory elements. The memory typically comprises native operating system 172, one or more native applications, emulation systems, or emulated applications for any of a variety of operating systems and/or emulated hardware platforms, emulated operating systems, etc. For example, the applications may include application specific software which may comprise some or all the components of the system. In accordance with such embodiments, the components are stored in memory and executed by the processing device. Note that although motion response system 180 is depicted as not being resident in memory 170, in some embodiments, a motion response system may be stored therein.

Touchscreen interface 166 is configured to detect contact within the display area of the display 164 and provides such functionality as on-screen buttons, menus, keyboards, softkeys, etc. that allows users to navigate user interfaces by touch.

One of ordinary skill in the art will appreciate that the memory may, and typically will, comprise other components which have been omitted for purposes of brevity. Note that in the context of this disclosure, a non-transitory computer-readable medium stores one or more programs for use by or in connection with an instruction execution system, apparatus, or device.

With further reference to FIG. 4, network/communication interface device 168 comprises various components used to transmit and/or receive data over a networked environment. By way of example, such components may include a wireless communications interface. When such components are embodied as an application, the one or more components may be stored on a non-transitory computer-readable medium and executed by the processing device.

Accelerometer(s) 178 may include one or more of various types of sensors for detecting acceleration of the electronic device. These may include one or more of various gyroscopes, which may be configured to sense multi-axis accelerations and/or other devices, which may be configured to sense linear accelerations. In operation, the accelerometer(s) experience motion associated with movement of the electronic device, and responsive to the motion provide information corresponding to sensed accelerations. In some embodiments, this information may be used directly by the motion response system while, in other embodiments, the information may be used as an input to another component or components for modification prior to use by the motion response system.

Responsive to the information corresponding to the sensed accelerations, the motion response system may alter a mode of operation of the electronic device. In this embodiment, the motion response system may alter a mode of operation of the image capturing device if the image capturing device has been actuated (e.g., a camera function of a mobile phone is turned on). Depending upon the sensed parameters, which may include the state of the image capturing device and the sensed accelerations, various modes such as zooming and video capture may be altered.

Figure 5:
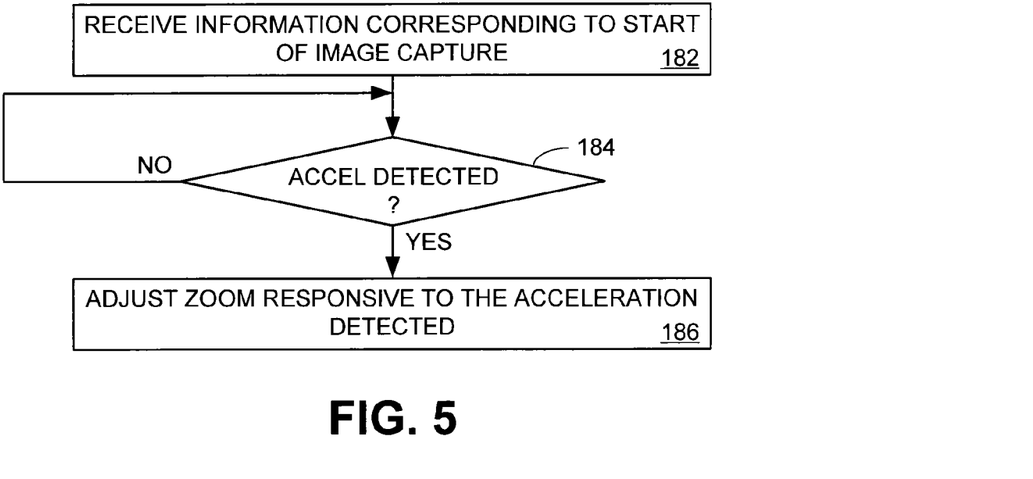
FIG. 5 is a flowchart depicting functionality that may be performed by an example embodiment of a motion response system.

FIG. 5 is a flowchart depicting functionality that may be performed by an example embodiment of a motion response system. As shown in FIG. 5, the functionality (or method) may be construed as beginning at block 182, in which information corresponding to start of image capture is received. In some embodiments, this information may be associated with turning on of a camera function of a mobile phone or turning on a digital camera, for example. In block 184, a determination is made as to whether an acceleration has been detected. If an acceleration is not detected, the process may return to block 184. If, however, an acceleration is detected, the process may proceed to block 186, in which zoom of an associated image capturing device is adjusted responsive to the detected acceleration.

If embodied in software, it should be noted that each block depicted in the flowchart of FIG. 5 (or any of the other flowcharts) represents a module, segment, or portion of code that comprises program instructions stored on a non-transitory computer readable medium to implement the specified logical function(s). In this regard, the program instructions may be embodied in the form of source code that comprises statements written in a programming language or machine code that comprises numerical instructions recognizable by a suitable execution system. The machine code may be converted from the source code, etc. If embodied in hardware, each block may represent a circuit or a number of interconnected circuits to implement the specified logical function(s). Additionally, although the flowcharts show specific orders of execution, it is to be understood that the orders of execution may differ.

Figure 6:
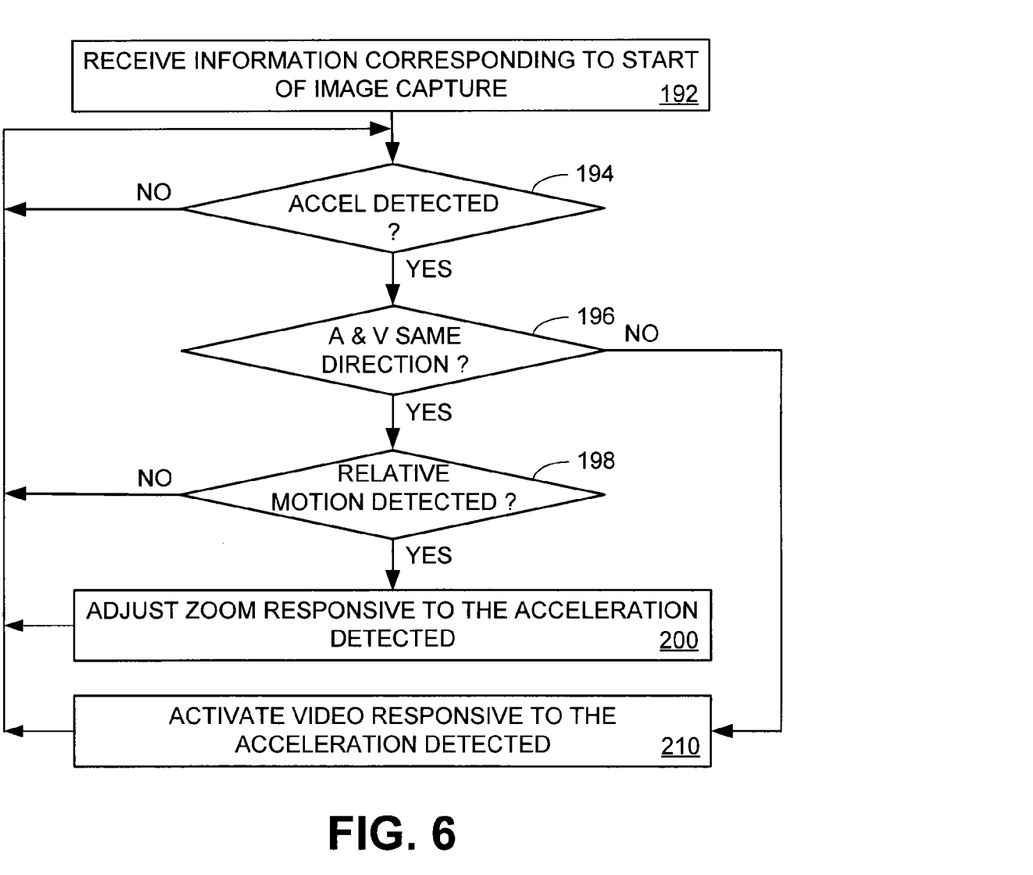
FIG. 6 is a flowchart depicting functionality that may be performed by an example embodiment of a motion response system.

FIG. 6 is a flowchart depicting functionality that may be performed by another example embodiment of a motion response system. As shown in FIG. 6, the functionality (or method) may be construed as beginning at block 192, in which information corresponding to start of image capture is received. In block 194, a determination is made as to whether an acceleration has been detected. In general, acceleration events corresponding to a gesture may occur over durations of 2 seconds or less and may mathematically contribute to a net zero change in velocity.

If an acceleration is not detected, the process may return to block 194. If, however, an acceleration is detected, the process may proceed to block 196, in which a determination is made as to whether the detected acceleration and velocity of the device are in the same direction. Notably, if the acceleration and velocity are in the same direction, movement of the device is generally in a straight line. However, if the acceleration and velocity are not in the same direction, this may indicate that the device is moving through some sort of curve.

If it is determined in block 196 that the acceleration and velocity are in the same direction, the process may proceed to block 198, in which a further determination is made. In particular, a determination is made as to whether relative motion of the device and the user is detected. Notably if relative motion is not detected, this may be indicative of the user and device being on a moving platform, such as in an automobile, for example. Thus, if relative motion is not detected (which may indicate movement that the user is not intending to be used for actuating a feature of the device), the process may return to block 194 and proceed as described as before. If it is determined in block 198 that relative motion has been detected, the process may proceed to block 200, in which zoom of an associated image capturing device may be adjusted responsive to the acceleration detected. For instance, if the acceleration detected is toward an object that the image capturing device may be acquiring an image, zooming in may be performed; however, if the acceleration is away from the object, zooming out may be performed.

Returning to block 196, if it is determined that the acceleration and velocity are not in the same direction, the process may proceed to block 210, in which video capturing functionality may be activated responsive to the detected acceleration. That is, the operational mode of the image capturing device may be altered from that of image capture to video capture responsive to the detected acceleration.

It should be noted that, in some embodiments, altering a mode of operation from image capture to video capture may be performed responsive to criteria different than that described above. By way of example, acceleration of the electronic device in a direction that is neither toward nor away from an object of interest may actuate the video capture mode. Clearly, other criteria may be used in still other embodiments.

Figure 7:
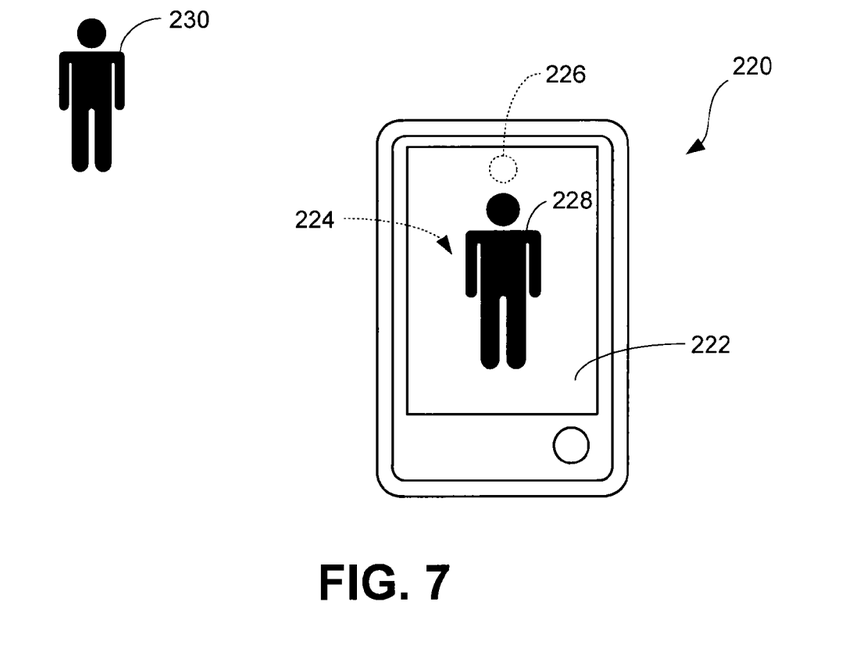
FIG. 7 is a schematic diagram of an example embodiment of an electronic device using an image capture function.
Figure 8:
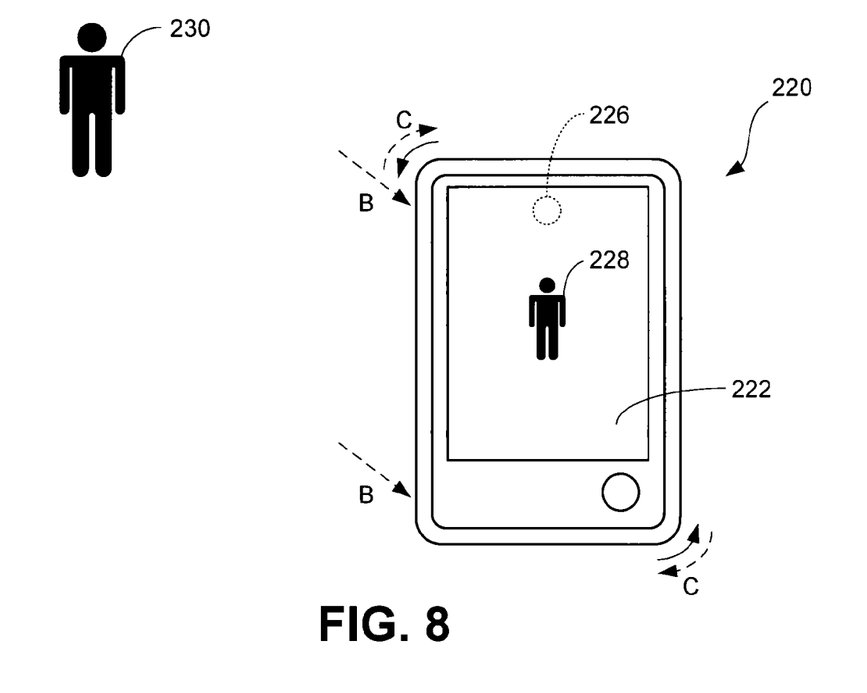
FIG. 8 is a schematic diagram of the embodiment of FIG. 7 showing motion response functionality.

FIG. 7 is a schematic diagram of another example embodiment of an electronic device using an image capture function, with FIG. 8 demonstrating motion response functionality. As shown in FIG. 7, electronic device 220 is configured as a smartphone that incorporates a display device 222 and an image capturing device 224, which includes a rear-facing camera 226.

FIG. 7 also depicts a displayed image 228 that is associated with an object 230. Based on the characteristics and settings of the image capturing device, as well as the size of the object and distance between the object and camera 226, the displayed image 228 exhibits a display size. In this case, the display size includes an image height that is approximately 60% of the height of the display.

In FIG. 8, the display size of displayed image 228 has decreased dramatically responsive to motion of camera 226 away from object 230 (depicted by the dashed arrows "B"). Notably, the image height is now approximately 25% of the height of the display 222, while the camera has moved a negligible distance away from the object. This functionality is accomplished by a motion response system (not shown) that is resident on electronic device 220. In this case, sensed acceleration of device 220 away from object 230 resulted in actuation of a zoom-out function of the image capturing device without further actuation by the user. It should be noted that if the user desires to further decrease the zoom after moving the device as indicated by arrows B, the user may ratchet the movement of the device. Specifically, the user may move the device quickly toward the object (i.e., more quickly than was used to actuate the zooming out function) and then back away from the object as before to continue with the zooming out.

Also depicted in FIG. 8 are sets of dashed arrows "C" that represent motion of the electronic device in a steering wheel motion. In this embodiment, such a steering wheel motion is used to de-activate the zooming function provided by the motion response system. For instance, after zooming the image by moving the device away from the object, the user may wish to take over manual control of the zooming function. This may be accomplished by moving the device in this steering wheel motion, after which manual inputs may dominate the image capture functionality.

Figure 9:
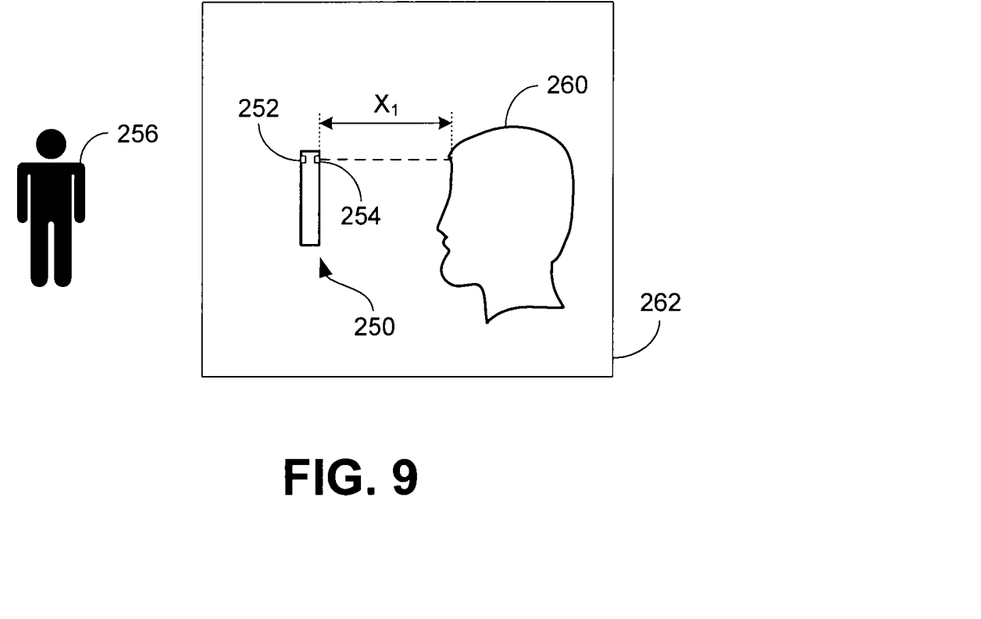
FIG. 9 is a schematic diagram of an example embodiment of an electronic device using an image capture function.
Figure 10:
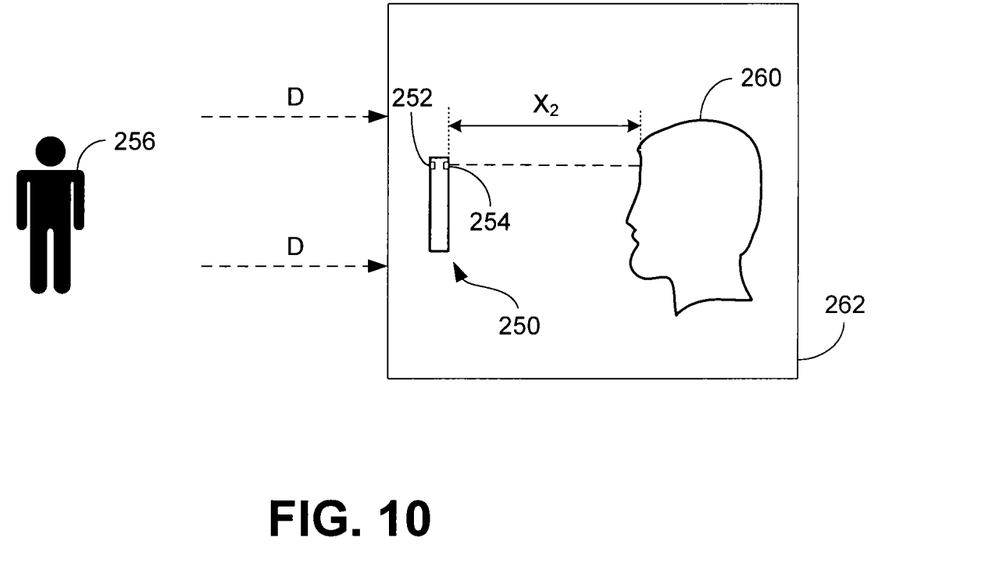
FIG. 10 is a schematic diagram of the embodiment of FIG. 9 showing motion response functionality involving filtering of extraneous acceleration inputs.

FIG. 9 is a schematic diagram of another example embodiment of an electronic device using an image capture function, with FIG. 10 demonstrating motion response functionality involving filtering of extraneous acceleration inputs. As shown in FIG. 9, electronic device 250 includes an image capturing device that incorporates both a rear-facing camera 252 and a distance sensor 254, which includes a front-facing camera. Electronic device 250 is currently oriented so that the rear-facing camera is able to acquire an image corresponding to object 256. Note also that electronic device 250 and a user 260 of that device are within a vehicle (represented by box 262), with device 250 being a distance $X_1$ from the user.

In FIG. 10, it is shown that user 260 and device 250 have moved farther from object 256 than that which was depicted in FIG. 9. In an embodiment such as depicted in FIGS. 7 and 8, for example, movement of the device away from the object (as sensed by an accompanying accelerometer) may cause the device to alter the mode of operation by zooming-out from the object. However, in this case, the associated motion response system (not shown) of device 250 filters the extraneous acceleration associated with the vehicle 262. Specifically, device 250 determines that even though the device is actually accelerating away from the object, the motion response system causes the image capturing device of electronic device 250 to zoom in toward the object. This is because the distance between the user and the device 250 has been determined to increase to distance $X_2$, which is larger than distance $X_1$.

In this embodiment, the increase in distance between the user and the electronic device has been determined to increase via use of the front-facing camera. Although capable of being determined in various manners, one such manner includes use of an embedded range finder of the camera, another involves the use of facial feature mapping. For instance, as the detected spacing between the eyes of the user decreases on an image capturing device, this correlates to an increase in distance between the user and the electronic device. This image analysis data can be used to corroborate the data obtained from accelerometer(s).

Figure 11:
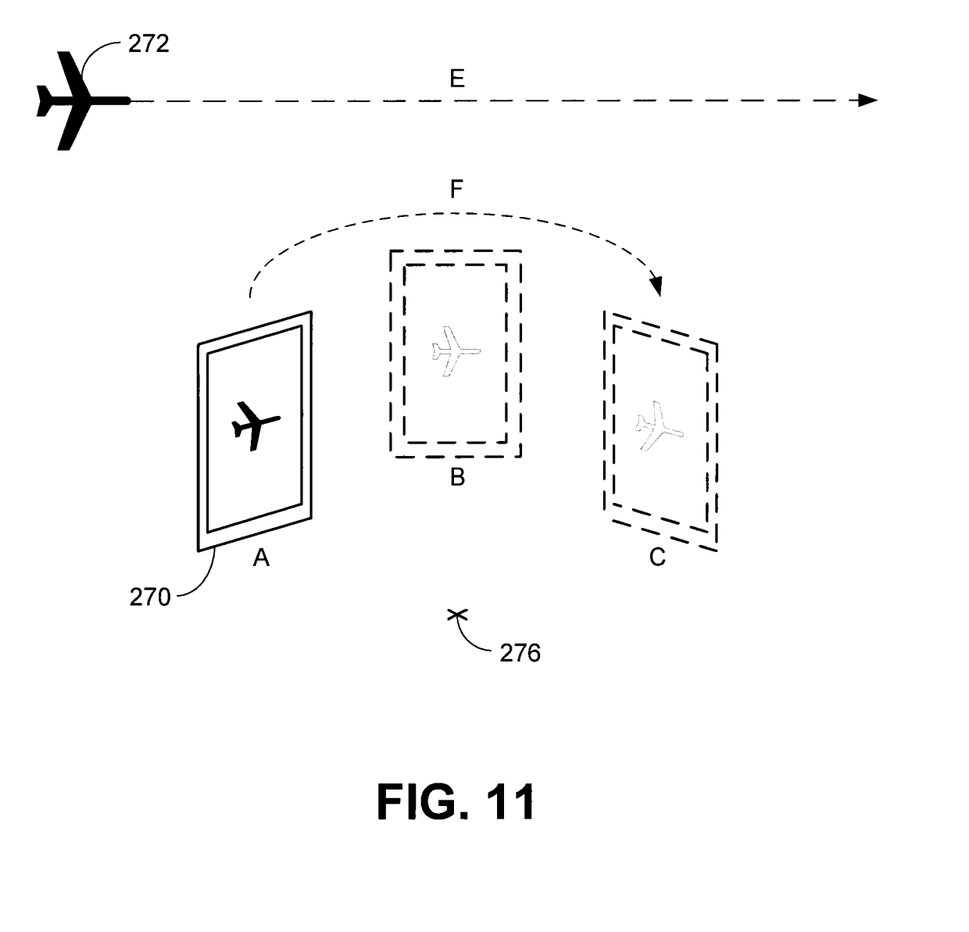
FIG. 11 is a schematic diagram of an example embodiment of an electronic device showing motion response functionality involving video capture.

FIG. 11 is a schematic diagram of an example embodiment of an electronic device showing motion response functionality involving video capture. As shown in FIG. 11, an electronic device 270, which incorporates an image capturing device and a motion response system, is acquiring an image of an object 272 that is moving along the path represented by the dashed arrowed line "E". In this case, the object is moving rather quickly across the field of view and the associated accelerometer(s) of the electronic device detect motion from position A to position B and then to position C in a relatively short period of time (e.g., 0.5 sec). Responsive to the detected acceleration, the mode of operation of the image capturing device is altered automatically from image capture to video capture. This functionality may tend to allow the user a greater opportunity to capture a desired image as the device is moved rather quickly.

In the depicted embodiment, the motion of the electronic device is through an arc represented by dashed lone "F" about a point 276, which may correspond to the shoulder of a user, for example, as the user moves his arm to direct the rear-facing camera toward object 272. Note also that the distance between the camera and the object has changed relatively little, owing primarily to the relatively great distance between the object and the camera. Thus, actuation of the video capture may be based, at least in part in some embodiments, on detected accelerations that are transverse with respect to the object. Additionally, or alternatively, actuation may be based, at least in part in some embodiments, on detected motions about a point.

It should be emphasized that the above-described embodiments are merely examples of possible implementations. Many variations and modifications may be made to the above-described embodiments without departing from the principles of the present disclosure. By way of example, the systems described may be implemented in hardware, software or combinations thereof. All such modifications and variations are intended to be included herein within the scope of this disclosure and protected by the following claims.

At least the following is claimed:

1. An electronic device comprising:
   an image capturing device operative to acquire image data;
   a display device operative to display the image data acquired;
   an accelerometer operative to sense an acceleration and velocity of the electronic device; and
   a motion response system operative to receive acceleration information corresponding to a sensed acceleration and velocity information corresponding to a sensed velocity, and to alter a mode of operation of the image capturing device based, at least in part, on the acceleration information and the velocity information;
   wherein the video capture mode of the image capturing device is actuated based, at least in part, on the acceleration information and the velocity information received corresponding to motion of the accelerometer along an arc between a first position and a second position, with the user being located at the center of the arc; and
   wherein, in the first position, the image capturing device exhibits a first field of view and, in the second position, the image capturing device exhibits a second field of view displaced from and in a non-overlapping relationship with the first field of view.

2. The device of claim 1, wherein:
   the image capturing device exhibits a zoom feature for zooming in toward an object of interest and zooming out from the object of interest; and
   responsive to the acceleration information received corresponding to movement of the device relative to the object of interest, the zoom feature of the image capturing device zooms relative to the object of interest.

3. The device of claim 1, wherein, based on the acceleration information indicating movement toward the object of interest, the zoom feature of the image capturing device zooms in such that a magnification of the object of interest increases.

4. The device of claim 1, wherein, based on the acceleration information indicating movement away from the object of interest, the zoom feature of the image capturing device zooms out such that a magnification of the object of interest decreases.

5. The device of claim 1, wherein the motion response system is further operative to filter accelerations not associated with movement of the image capturing device relative to the user of the device.

6. The device of claim 5, wherein the device further comprises a distance sensor operative to detect a change in distance between a user and the sensor for determining the accelerations not associated with movement of the image capturing device relative to the user.

7. The device of claim 6, wherein:
   the image capturing device comprises a rear-facing camera operative to acquire the image data corresponding to the object of interest; and
   the distance sensor comprises a front-facing camera operative to acquire image data associated with movement of the image capturing device relative to the user.

8. The device of claim 1, wherein the arc is in a substantially horizontal plane.

9. The device of claim 1, wherein the motion response system is further operative to alter the mode of operation of the image capturing device based, at least in part, on the image capturing device being activated.

10. The device of claim 1, wherein the electronic device is a smartphone.

11. A method for acquiring images comprising:
    sensing acceleration associated with an image capturing device;
    sensing velocity associated with the image capturing device; and
    altering a mode of operation of the image capturing device such that a video capture mode of the image capturing device is actuated;
    wherein actuating the video capture mode of the image capturing device is based, at least in part, on the acceleration information and the velocity information received corresponding to motion of the image capturing device along an arc between a first position and a second position, with a user of the image capturing device being located at the center of the arc; and
    wherein, in the first position, the image capturing device exhibits a first field of view and, in the second position, the image capturing device exhibits a second field of view displaced from and in a non-overlapping relationship with the first field of view.

12. The method of claim 11, wherein altering an operation comprises altering zoom of the image capturing device.

13. The method of claim 12, wherein altering zoom comprises zooming in toward an object of interest responsive to the acceleration being toward the object of interest.

14. The method of claim 12, wherein altering zoom comprises zooming out from an object of interest responsive to the acceleration being away from the object of interest.

15. The method of claim 12, further comprising disregarding accelerations affecting both a user of the image capturing device and the image capturing device such that the accelerations do not alter the zoom.

16. The method of claim 15, wherein disregarding accelerations comprises:
    monitoring a distance between the user and the image capturing device; and correlating changes in distance between the user and the image capturing device as being associated with accelerations not to be disregarded.

17. The method of claim 13, further comprising discontinuing altering the mode of operation based, at least in part, on a designated movement of the image capturing device.

18. The method of claim 17, wherein the designated movement is a rotation of the image capturing device in a steering wheel motion.

* * * * *